United States Patent [19]
Larson et al.

[11] Patent Number: 5,222,205
[45] Date of Patent: Jun. 22, 1993

[54] METHOD FOR GENERATING ADDRESSES TO TEXTURED GRAPHICS PRIMITIVES STORED IN RIP MAPS

[75] Inventors: Ronald D. Larson; Monish S. Shah, both of Fort Collins, Colo.

[73] Assignee: Hewlett-Packard Company, Palo Alto, Calif.

[21] Appl. No.: 494,706

[22] Filed: Mar. 16, 1990

[51] Int. Cl.⁵ .............................................. G09B 9/08
[52] U.S. Cl. ................................................. 395/130
[58] Field of Search ....................... 395/130, 131, 126

[56] References Cited
U.S. PATENT DOCUMENTS

| | | | |
|---|---|---|---|
| 4,851,825 | 7/1989 | Naiman | 340/728 |
| 5,097,427 | 3/1982 | Lathrop et al. | 395/130 |

Primary Examiner—Gary V. Harkcom
Assistant Examiner—Huynh Ba
Attorney, Agent, or Firm—Guy J. Kelley

[57] ABSTRACT

Methods for texture mapping graphics primitives in a graphics pipeline architecture system. The methods utilize rectangular box filters to down-sample original texture maps thereby optimizing aliasing and blurring when graphics primitives have a two-dimensional texture mapped to a three-dimensional object. The methods of texture mapping graphics primitives in a frame buffer graphics system comprise the steps of determining an original texture map of two dimensions for a surface, storing the original texture map in the frame buffer, sampling the original texture map independently using an asymmetrical filter to construct multiple versions of a texture and to address textured pixels on a display in the frame buffer graphics systems, mapping the textured pixels to areas on the frame buffer, and displaying the textured graphics primitives on the display. A technique for addressing textured pixels stored in a rectangular texture (RIP) map is also described.

3 Claims, 4 Drawing Sheets

METHOD FOR GENERATING ADDRESSES TO TEXTURED GRAPHICS PRIMITIVES STORED IN RIP MAPS

FIELD OF THE INVENTION

This invention relates to methods and apparatus for rendering graphics primitives to frame buffers in computer graphics systems. More specifically, this invention relates to methods and apparatus for texture mapping graphics primitives in computer graphics frame buffer systems and displaying the textured graphics primitives.

BACKGROUND OF THE INVENTION

Computer graphics workstations can provide highly detailed graphics simulations for a variety of applications. Engineers and designers working in the computer aided design (CAD) and computer aided management (CAM) areas typically utilize graphics simulations for a variety of computational tasks. The computer graphics workstation industry has thus been driven to provide more powerful computer graphics workstations which can perform graphics simulations quickly and with increased detail.

Modern workstations having graphics capabilities generally utilize "window" systems to accomplish graphics manipulations. As the industry has been driven to provide faster and more detailed graphics capabilities, computer workstation engineers have tried to design high performance, multiple window systems which maintain a high degree of user interactivity with the graphics workstation.

A primary function of window systems in such graphics systems is to provide the user with simultaneous access to multiple processes on the workstation. Each of these processes provides an interface to the user through its own area onto the workstation display. The overall result for the user is an increase in productivity since the user can then manage more than one task at a time with multiple windows displaying multiple processes on the workstation.

In graphics systems, some scheme must be implemented to "render" or draw graphics primitives to the system's screen. "Graphics primitives" are a basic component of a graphics picture, such as a polygon or vector. All graphics pictures are formed with combinations of these graphics primitives. Many schemes may be utilized to perform graphics primitives rendering. One such scheme is the "spline tessellation" scheme utilized in the TURBO SRX graphics system provided by the Hewlett Packard Company.

The graphics rendering procedure generally takes place within a piece of graphics rendering hardware called a "frame buffer." A frame buffer generally comprises a plurality of video random access memory (VRAM) computer chips which store information concerning pixel activation on the system's display screen corresponding to the particular graphics primitives which will be traced out on the screen. Generally, the frame buffer contains all the graphics data information which will be written onto the windows, and stores this information until the graphics system is prepared to trace this information on the workstation's screen. The frame buffer is generally dynamic and is periodically refreshed until the information stored on it is written to the screen.

Thus, computer graphics systems convert image representations stored in the computer's memory to image representations which are easily understood by humans. The image representations are typically displayed on a cathode ray tube (CRT) device that is divided into arrays of pixel elements which can be stimulated to emit a range of colored light. The particular color of light that a pixel emits is called its "value." Display devices such as CRTs typically stimulate pixels sequentially in some regular order, such as left to right and top to bottom, and repeat the sequence 50 to 70 times a second to keep the screen refreshed. Thus, some mechanism is required to retain a pixel's value between the times that this value is used to stimulate the display. The frame buffer is typically used to provide this "refresh" function.

Since frame buffers are usually implemented as arrays of VRAMs, they are "bit mapped" such that pixel locations on a display device are assigned x,y coordinates on the frame buffer. A single VRAM device rarely has enough storage locations to completely store all the x,y coordinates corresponding to pixel locations for the entire image on a display device, and therefore, multiple VRAMs are generally used. The particular mapping algorithm used is a function of various factors, such as what particular VRAMs are available, how quickly the VRAM can be accessed compared to how quickly pixels can be rendered, how much hardware it takes to support a particular mapping, and other factors.

Typical CRT devices for use with graphics workstations are "raster scan" display devices. Typical raster scan display devices generate images comprising a multiplicity of parallel, non-overlapping bands of pixels comprising sets of parallel lines. An example of such a system is disclosed in U.S. Pat. No. 4,695,772 to Lau et al. The raster scan device disclosed in the Lau et al. patent is organized as an array of tiles.

Raster scan devices generally utilize a multiplicity of beams for simultaneously imaging data on a corresponding multiplicity of parallel scan lines. The multiplicity of beams generally write from the left side of the display CRT to the right side of the display CRT. For the purposes of dividing the CRT into tiles (a process called "tiling"), each tile is considered to comprise a depth equal to the multiplicity of scan lines, with each tile being a particular number of pixels wide. The resulting graphics primitive image thus comprises a multiplicity of parallel, non-overlapping sets of parallel lines of pixels generated by a separate sweep of electron beams across the CRT screen. As described by Lau et al., the tiles are generally rectangular, and thus organize the image into arrays having a plurality of rows by a set number of columnar tiles.

Early graphics systems which displayed synthesized raster images failed to provide realistic images which were usable to model many different, complex graphics figures. The main criticism of these earlier raster images was the extreme smoothness of the surfaces. Early raster images showed no textures, bumps, scratches or other real world surface features which are found on objects. See Heckbert, P. S., *A Survey of Texture Mapping, IEEE Computer Graghics and Applications,* Vol. 6, No. 11, November 1986, pp. 56–67. In answer to this early problem which plagued raster images, "texture mapping" was developed to model the complexity of real world surface images. As known by those with skill in the art, "texture mapping" means the mapping of a function onto a surface in three dimensions. Texture mapping is a relatively efficient way to create the appearance of complexity without the tedium of modelling and rendering three-dimensional detail which might be found on the surface of an object.

Many parameters have been texture mapped in the past. Some of these include surface color, specular reflection, normal vector perturbation, specularity, transparency, diffuse reflection, shadows, and local coordinate system or "frame mapping." In texture mapping, a source image known as the "texture" is mapped onto a surface in three-dimensional "object" space. The three-dimensional surface is then mapped to the destination image, which is generally a graphics display screen. As described by Heckbert, the mapping from texture space to screen space may be split into two phases. First, a surface parameterization that maps texture space to object space, followed by a standard modelled and viewing transformation that maps the object space to screen space with a perspective projection is accomplished. Then these two mappings are convolved to find the overall two-dimensional texture space to two-dimensional screen space mapping, and the intermediate three-dimensional space is discarded.

Many schemes have been employed to accomplish graphics primitive texture mapping. One such scheme is the "Pyramidal Parametrics" scheme which utilizes trilinear interpolation of pyramidal images utilizing a filtering technique whose output is a continuous function of position (U,V) and diameter (D). *Pyramidal Parametrics, Computer Graghics* (PROC SIGGRAPH 83) Vol. 17, No. 3, July 1984, pp. 213–222. Such a technique is described by Williams in pyramidal parametrics scheme incorporates a bilinear interpolation on two levels of a mapped pyramid texture map, and a linear interpolation between two of the levels. The filter employed to accomplish the trilinear interpolation has a constant cost of eight pixel accesses and seven multipliers per screen pixel. To accomplish the texture mapping, a square box filter to construct the image pyramid is used, although it is possible to use a Gaussian filter.

Williams introduced the concept of a "MIP" map which is a particular format for two-dimensional parametric functions, along with an associated addressing scheme. The acronym "MIP" is derived from the latin phrase "multum in parvo" which means "many things in a small place." A MIP map supplements bilinear interpolation of pixel values in a texture map with interpolation between prefiltered versions of the map which may then be used to compress many pixels into a small place.

MIP mapping generally offers greater speed than other texturing algorithms which perform successive convolutions over an area in a texture map for each particular pixel which is rendered. MIP maps are generally indexed by three coordinates U,V,D. U and V are spatial coordinates for the map, while D is the variable used to index and interpolate between the different levels of the MIP map pyramid.

A MIP map provides a fast solution in texture mapping since it compresses texture to two factors. First, filtering of the original texture takes place when the MIP map is first created. Second, subsequent filtering is approximated by blending different levels of the MIP map such that all filters are approximated by linearly interpolating a set of square box filters, the size of which are powers of two pixels in length. MIP mapping entails a fixed overhead which is independent of the area filtered to compute a sample.

MIP map memory organization achieves the desired speedy result in texture mapping since corresponding points in different prefiltered maps can be addressed simply by a binary shift of an input (U,V) coordinate pair. Routines for creating MIP maps are based on simple box or "Fourier" window prefiltering, followed by bilinear interpolation of pixels within each map instance, and then linear interpolation between two maps for each value of D, which is generally the pyramid's vertical coordinate. However, since MIP maps utilize box or Fourier windows, a severe compromise in texture mapping accuracy is made by utilizing a MIP map. Since a box window is symmetrical, each of the prefiltered levels of the map is filtered equally in an x and y direction.

As known by those with skill in the art, choosing the value of D trades off aliasing against blurring. Aliasing occurs as small or highly curved objects move across a raster scan since their surface normals may meet erratically with the sampling grid. Blurring occurs when the resolution of the system is not high enough to display the particular texture. Choosing the D value trades off the aliasing phenomena against blurring. Thus, a balance must generally be struck in a graphics system to give acceptable aliasing along with acceptable blurring. However, with MIP maps utilizing box or Fourier windows, this becomes nearly impossible as the pixel's projection in a texture map deviates from symmetry. Therefore, MIP maps do not satisfy a long-felt need in the art for methods and apparatus which efficiently, accurately and quickly texture map graphics primitives in graphics frame buffer systems.

SUMMARY OF THE INVENTION

The inventors of the subject matter herein claimed and disclosed have invented methods and apparatus for texture mapping graphics primitives in a frame buffer graphics system which satisfies the above-mentioned long-felt needs. The invention herein claimed and disclosed is a modification of the MIP map described above which greatly reduces aliasing and blurring problems and provides a hardware solution to attaining accurate texture mapping of graphics primitives.

In accordance with the present invention, methods of texture mapping graphics primitives in a frame buffer graphics system are provided. The methods comprise the steps of determining an original texture map in two dimensions for a surface, storing the original texture map in the frame buffer, sampling the original texture map independently in the two dimensions using an asymmetrical filter to construct multiple versions of a texture and to address textured pixels on a display in the frame buffer graphics system, mapping the textured pixels to rectangular areas on the frame buffer, and displaying the textured graphics primitives on the display.

Further, in accordance with the present invention, apparatus for texture mapping graphics primitives are provided. The apparatus comprise frame buffer means for storing pixel value data corresponding to graphics primitives, determination means interfaced with the frame buffer means for determining an original texture map in two dimensions for the graphics primitives, asymmetric filter means interfaced with the determination means for sampling the original texture map independently in the two dimensions to construct multiple versions of a texture and to address the frame buffer means with textured pixel value data, mapping means interfaced with the frame buffer means for addressing textured pixels on rectangular areas in the original texture map, and display means interfaced with the frame buffer means for displaying the textured pixel value data.

DETAILED DESCRIPTION OF PREFERRED EMBODIMENTS

Figure 1:
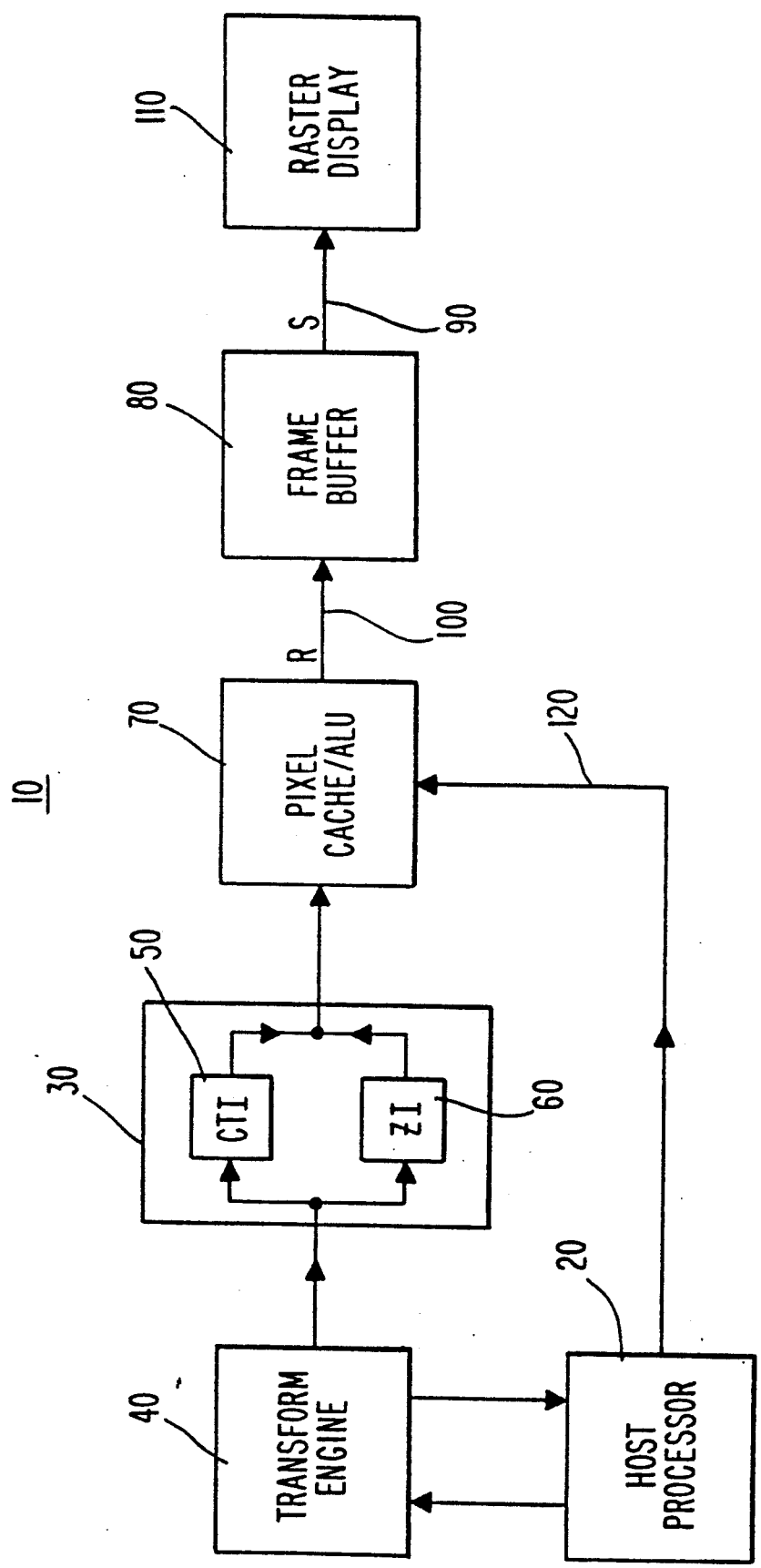
FIG. 1 is a block diagram illustrating a graphics pipeline architecture for texture mapping graphics primitives.

Referring now to the drawings wherein like reference numerals refer to like elements, FIG. 1 shows a frame buffer graphics system generally at 10. A host processor 20 generally comprises a high performance CPU, cache memory, a system memory, and a bus adaptor. Host processor 20 runs the graphics system's operating system utilizing various graphics libraries.

Host processor 20 transfers commands and data, including textures, to a transform engine 40 which is interfaced with a scan converter 30. Preferably, transform engine 40 is microcoded to perform the traditional tasks of viewing transforms, lighting calculations, clipping, radiosity, and other graphics functions. Rasterization of graphics primitives is performed by scan converter 30. In preferred embodiments, scan converter 30 comprises a color texture interpolator (CTI) 50 and a Z interpolator (ZI) 60. The CTI simultaneously interpolates a large number of pixel parameters, for example, red, green, blue (RGB) specular and diffuse parameters, alpha (XY) parameters, and texture parameters, while the Z interpolator only interpolates x,y and z values. After rasterization is accomplished by the CTI 50 and the ZI 60, a pixel cache/arithmetic logic unit (ALU) 70 performs gamma correction, dithering, Z compares, and blending of pixel color values with data previously stored in frame buffer 80.

In preferred embodiments, frame buffer 80 generally comprises dual port video random access memory (VRAM) chips. A serial port 90 provides raster display update, and a random port 100 provides refreshed pixel data to frame buffer 80. In still further preferred embodiments, frame buffer 80 comprises 24 planes of 2048 pixels. There are generally eight planes each of red, green and blue. An offscreen frame buffer (not shown) is used or texture storage, font storage, retained raster storage, and information used by windows in graphics pipeline 10.

In yet further preferred embodiments, graphics system 10 is a pipelined architecture wherein the various pieces of hardware provided along the pipeline perform complex graphics manipulations on the graphics primitives. Preferably, the host processor is further interfaced with the pixel cache/ALU 70 along a pipeline bypass shown generally at 120. The output of the VRAM arrays in frame buffer 80 drives color maps which in turn drive digital to analog converters in the raster display 110.

In yet further preferred embodiments, pixel cache/ALU 70, frame buffer 80 and an address generator (not shown) form a frame buffer subsystem which is used in texture mapping provided in accordance with the present invention. Many types of textures can be specified and stored by host processor 20. In preferred embodiments, there are at least 16 textures that can be defined simultaneously. The particular texture used must be downloaded into frame buffer 80 from host processor 20 along the graphics pipeline. The host processor is generally designed to manage the frame buffer so that the number of textures transferred is minimized.

The (U,V) values provided at each vertex generally specify the portion of the texture to be rendered on a primitive. In preferred embodiments, a transformation that is defined by specifying a window view port operation on a texture is accomplished. This transformation defines a mapping of the (UV) space to an (S,T) space that is actually used to index the texture. Preferably, there are few to no limitations on this mapping with respect to the number of repetitions possible on a single primitive. Thus, to the user there will be an illusion that the texture repeats infinitely in U and V. In the context of systems and methods provided in accordance with the present invention wherein windows are generally rendered to the frame buffer, texture mapping will herein be described as occurring in the (S,T) space.

The frame buffer subsystem referred to earlier uses S, T, Ln$\Delta$S, and Ln$\Delta$T from CTI 50 so that the address generator can calculate texture addresses for each pixel. Perspective correct $RGB_{diffuse}$ and $RGB_{specular}$ are also generated by CTI 50 and downloaded into pixel cache/ALU 70. In further preferred embodiments, pixel cache/ALU 70 combines light source data with the particular texture color to form the image pixel color value, and caches the image data for rendering to frame buffer 80. These four values utilized by the frame buffer subsystem generate the particular texture addressing and maps provided in accordance with the present invention which optimize aliasing and blurring and provide an efficient and quick hardware solution to texture mapping in graphics frame buffer systems.

Figure 2A:
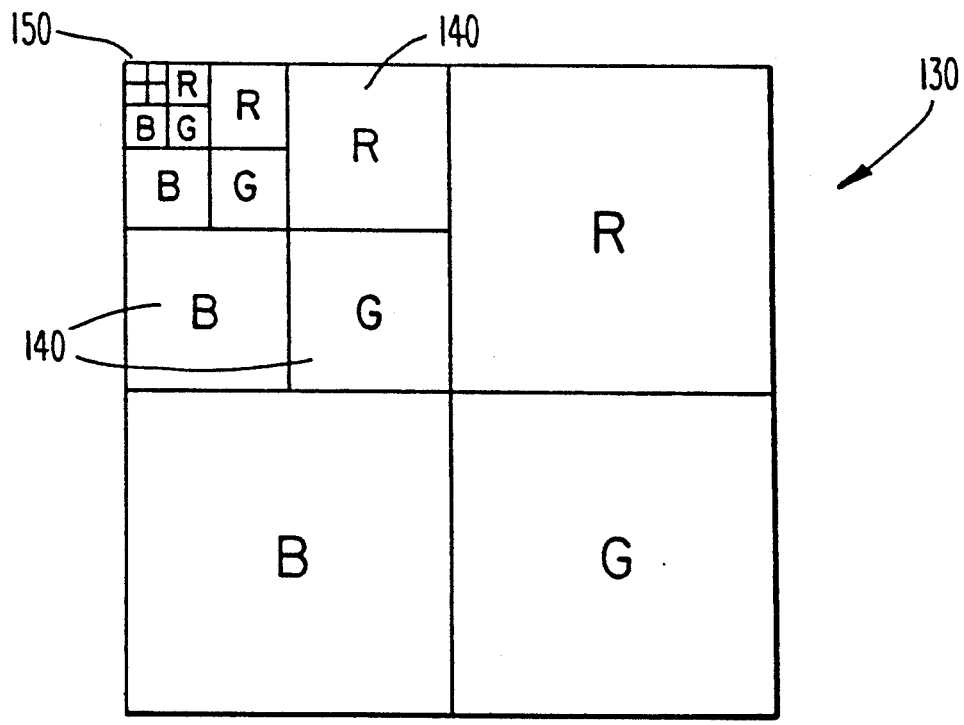
FIGS. 2A and 2B illustrate prior art texture MIP mapping wherein square box filters down-sample texture maps.
Figure 2B:
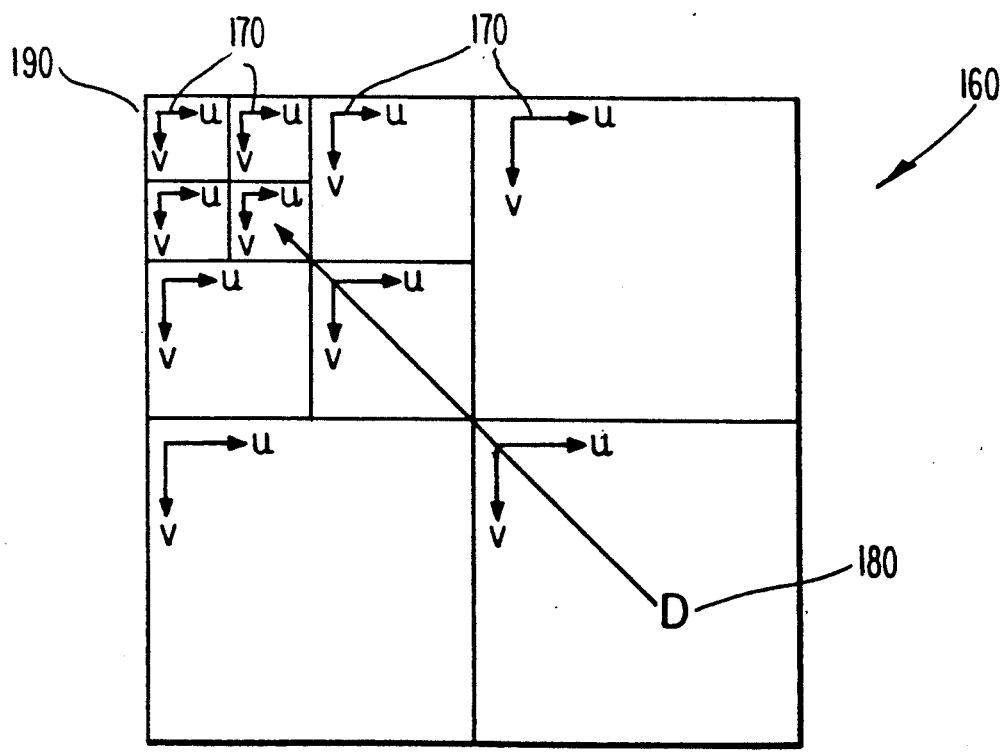

To better understand graphics textures provided in accordance with the present invention, FIG. 2A and 2B illustrate prior MIP maps which were described in the Williams paper *Pyramidal Parametrics*. FIG. 2A illustrates the color MIP map generally at 130. As shown, the image is separated into its red, green and blue components (the R's, G's and B's in the diagram). Successively filtered and down-sampled versions of each component are instanced above and to the left of the originals in a series of smaller and smaller images, each having half the linear dimension and a quarter the number of samples of its parent. These down-sampled versions are shown generally at 140. Successive divisions by four partition the frame buffer equally among the three components, with a single unused pixel theoretically remaining in the upper left hand corner, shown generally at 150. Thus, smaller and smaller images diminish into the upper left corner of the map and each of the images is averaged down from a much larger predecessor in prior art MIP maps.

FIG. 2B illustrates MIP map indexing shown generally at 160 according to the three coordinates U, V and D. The (U,V) coordinate system is superimposed on each of the filtered versions of the maps shown at 170. The variable "D", shown generally at 180, is the variable used to index and interpolate between the different levels of the MIP map which form a pyramid. "U" and "V" are the spatial coordinates of the map.

As with FIG. 2A, the indexing illustrated in FIG. 2B shows smaller and smaller images diminishing into the upper left corner of the map, 190, to a single unused pixel remaining in the upper left hand corner. Because square box filters are used in the prior art MIP maps illustrated in FIGS. 2A and 2B, each down-sampled version of each component is a square, symmetrical version of its parent. As mentioned previously, choosing the value of D to index and interpolate between the different levels of the pyramid trades off aliasing against blurring which cannot be optimized by prior art MIP maps since the pixel's projection texture map deviates from symmetry. Thus prior art MIP maps illustrated in FIGS. 2A and 2B fail to solve a long-felt need in the art for texture maps which can be used for a wide variety of applications and which will provide optimum aliasing and blurring of a textured graphics primitive.

In accordance with the present invention, a MIP map is generated using an asymmetrical box filter having a height and width in powers of two to filter the original texture. A textured pixel can thus be mapped to a rectangular area in the frame buffer. This allows for more accurate mapping of textures onto surfaces where filtering is required along only one dimension. Texture maps provided in accordance with the present invention are thus herein defined as "RIP" maps, for rectangular MIP maps.

The RIP maps provided in accordance with the present invention are made up of multiple texture maps down-sampled in the S and T dimensions independently. An original texture map is filtered and down-sampled by powers of two in each of these dimensions. If it is assumed that the original texture map is $2^n \times 2^m$ in pixels size, then the RIP map will have $(n+1) \times (m+1)$ maps. Each of these maps is a down-sampled version of the original texture map. Each of the down-sampled textured maps are precomputed and stored in the VRAMs on the frame buffer. This requires four times the original texture map memory to store the entire RIP map on the frame buffer.

Figure 3:
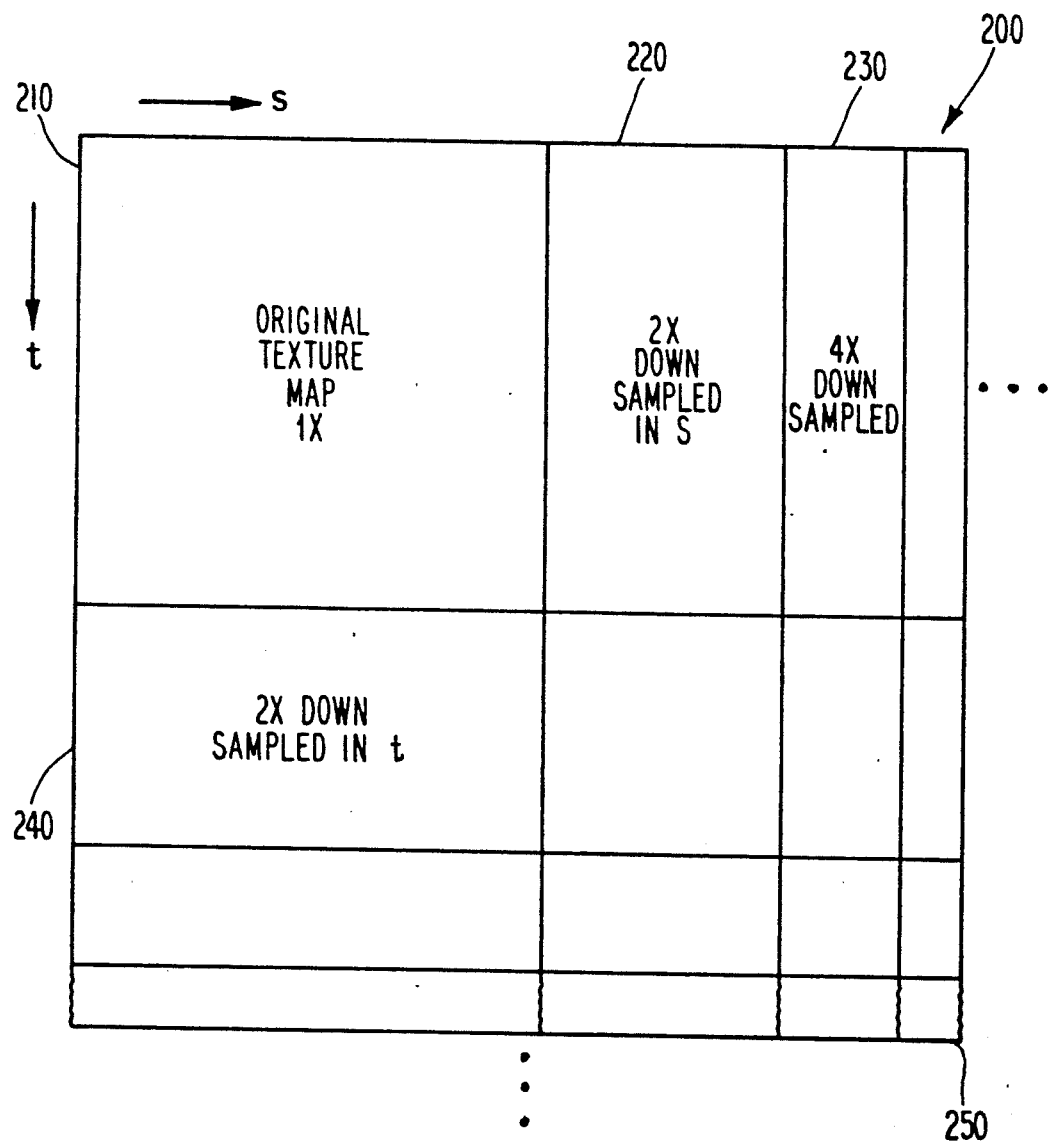
FIG. 3 is a RIP map provided in accordance with the present wherein a rectangular box filter down-samples an original texture map so that texture pixel value data can be mapped to rectangular areas in a frame buffer.

FIG. 3 illustrates a RIP map 200 provided in accordance with the present invention. The original texture map 210 is shown in S and T coordinates in the upper lefthand corner of the RIP map 200. In the S direction, 2× down-sampled texture map which has been rectangularly box filtered is shown at 220. Similarly, a 4× down-sampled in S texture map is shown at 230. The down-sampled texture maps in the S direction are each half the length of its parent. Similarly, a 2× down-sampled texture map in the T direction is shown at 240 and each of the down-sampled maps in T has half the height of its parent. The down-sampled maps are all rectangularly box filtered until a single unused pixel remains in the lower right hand corner 250 of the RIP map 200. Thus a textured pixel can now be mapped to a rectangular area in the frame buffer which significantly minimizes the aliasing and blurring of the textured graphics primitive.

The filtered maps are organized in offscreen memory such that the texture address calculations are simplified. However, since RIP maps require four times the memory of the original texture, in preferred embodiments a point sample mode which requires storing only the original texture and not any of the filtered maps may additionally be provided. This allows a larger texture to be used when there is limited space available on the frame buffer, although image quality is sacrificed due to increased aliasing.

Figure 4:
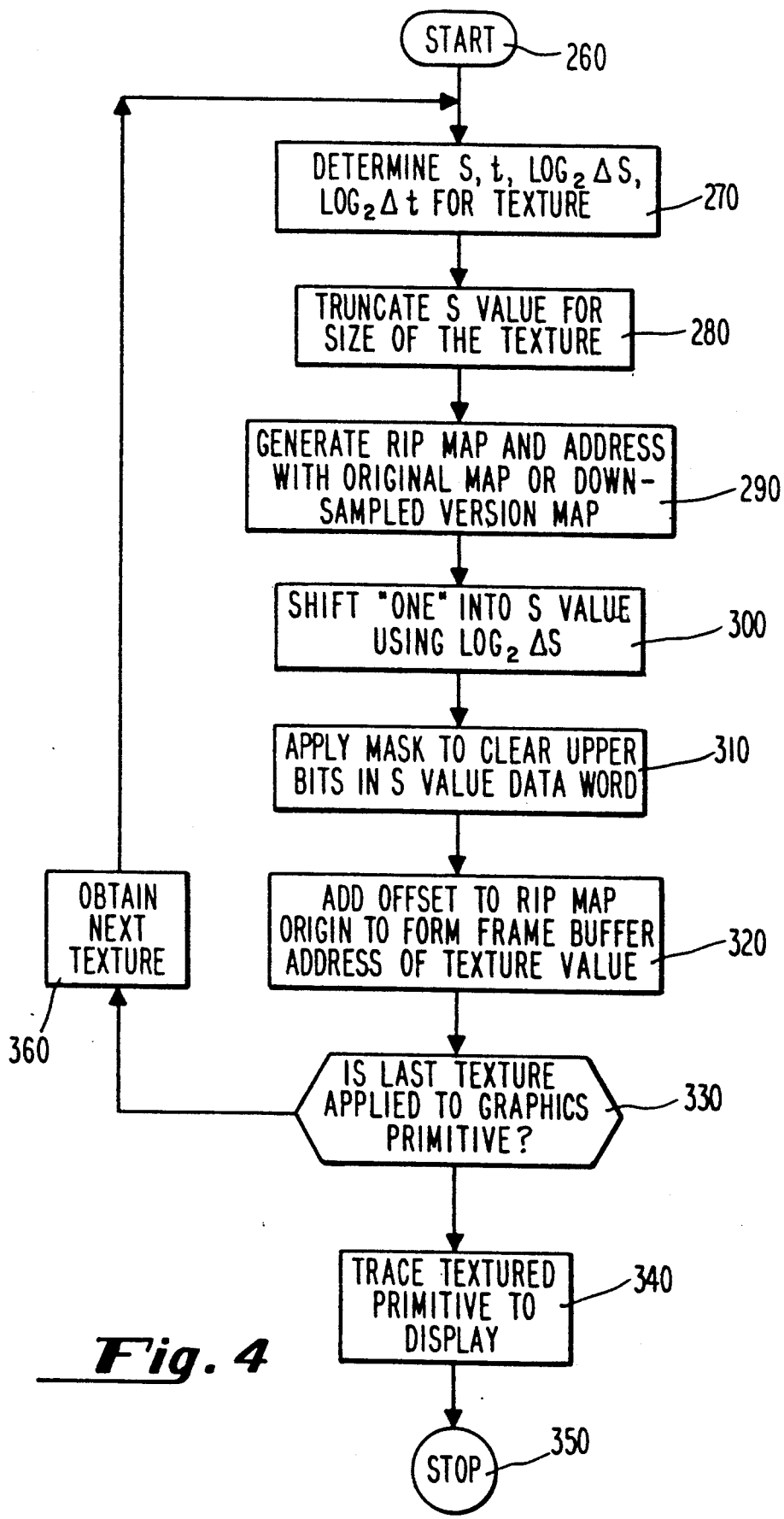
FIG. 4 is a flow chart that illustrates preferred embodiments of methods provided in accordance with this invention for texture mapping graphics primitives on a frame buffer graphics system.

FIG. 4 illustrates a flow chart for methods of addressing a RIP map starting at step 260. Since there are four values required to generate the texture address into a RIP map, at step 270 the four values S, T, $\log_2 \Delta S$ and $\log_2 \Delta T$ are obtained for each texture. The (S,T) values are defined as the texture coordinates at the center of the pixel in the screen space. The gradient values are an approximation of the area in texture space that is covered by the pixel. Using $\log_2 \Delta S$ and $\log_2 \Delta T$ in preferred embodiments aids in RIP map generation.

The remaining steps in FIG. 4 starting at step 280 shows a RIP map address being calculated for the S texture value, that is, a down-sampling in the S direction. In preferred embodiments, for a texture with 64 values, the S value is truncated at step 280 to the size of a texture. This is particularly useful when using a texture that repeats across a particular surface. Allowing S and T to exceed the size of the texture, and then truncating the S and T values causes the texture to repeat. In this fashion, only one copy of a texture is stored on the frame buffer. Truncating at step 280 occurs by clearing the upper bits that would overflow the texture.

The next step 290 in generating a RIP map address determines which map to use, that is, the original map or one of the many down-sampled versions. After choosing whether to use the original map, or a down-sampled version of the map using LnΔS which shifts the data in the S direction, "ones" are shifted into the S value at step 300. The "ones" are shifted into the S value starting one bit to the left of the most significant bit of the S value after truncation. This results in a truncated data word such that at step 310 a final mask can be applied to clear the upper bits which have been set at step 300. In preferred embodiments, this modified value of S becomes the offset into the RIP map.

At step 320 the offset to the RIP map is added to the origin to form a frame buffer address of the texture value. Preferably at step 330 it is determined whether the last texture has been applied to the graphics primitive. If the last texture has been applied to the graphics primitive then the graphics primitive is traced to the CRT display at step 340 and the process ends at step 350. If however, the last texture has not been applied to the graphics primitive, then a next texture is obtained at step 360 and the process begins again at step 270.

With methods and apparatus provided in accordance with the present invention, RIP map prefiltering is accomplished using a rectangular box filter. As was discussed above, the RIP map is generated by recursively down-sampling the original texture by powers of two independently in the S and T dimensions. For an exemplary two-times down-sampled in S texture map, for $0 \leq T < \text{size}-1$, $0 \leq S \leq \text{size}-1$, $I=0, 1, 2, 3 \ldots, S=0, 2, 4 \ldots$, the two-times down-sampled RIP map is determined by the following equation:

$$RIP[T][size+1] = (RIP[T][S] + RIP[T][S+1]) \div 2 .$$

The equation recited above will down-sample a "size×size" array in one dimension. The general size is a binary value, for example, 16, 32, 64 etc. The value T increments by one since this dimension is not presently being down-sampled while S steps by two from zero to "size." The two entries which come out of the original map are then averaged together and stored in the new map location starting at S equals "size."

A routine to generate a four-times down-sampled map is similar to the above routine. A four-times down-sampled map, given the same boundary conditions, can be found by the following equation:

$$RIP[T][size+(size \div 2)+1] = (RIP[T][S]+RIP[T][S+1]+RIP[T][S+2]+RIP[T][S+3]) \div 4.$$

For a four-times down-sampled texture map in the RIP map, the values are now stored starting at SIZE+(SIZE÷2) and S =0, 4, 8, 12, 16.

Similarly, the four values which are obtained from the last recited equation are averaged together. Recursive down-sampling can be accomplished for other down-sampled texture maps by constructing equations which are similar to the above two exemplary cases. All prefiltering for all down-sampled texture maps are accomplished with rectangular box filters which gives optimum aliasing and blurring.

Once the RIP map is created, it is sampled by accessing the frame buffer at the calculated address found through the exemplary method of FIG. 4. Texture color data is then read into the pixel cache/ALU to be combined with the light source color data. The resulting data is written back to the frame buffer memory. Data obtained from the texture map are the red, green and blue color values of the object. These values are combined with the perspective interpolated light source color data for each pixel. The diffuse component and specular components of the light source color data are each independently interpolated in the CTI. These texture values are combined with the diffuse and specular components to obtain the complete texture for the graphics primitive.

There have thus been described certain preferred embodiments of methods and apparatus for generating textured graphics in frame buffer computer graphics systems. While preferred embodiments have been described and disclosed, it will be recognized by those with skill in the art that modifications are within the true spirit and scope of the invention. The appended claims are intended to cover all such modifications.

What is claimed is:

1. A method of addressing a rectangular texture map stored in a frame buffer and displaying a textured graphics primitive on a display device, comprising the steps of:

obtaining texture coordinate values S and T at the center of a pixel in screen space of said display device;

calculating texture gradient values $log_2 \Delta S$ and $log_2 \Delta T$ as an approximation of an area in texture space covered by said pixel;

calculating an S address to said frame buffer for said S texture coordinate value by:

(a) truncating said S texture coordinate value to the size of a predetermined texture, (b) choosing one of a texture map for said predetermined texture and a down-sampled rectangular texture map corresponding to said predetermined texture for display on said display device, (c) using $log_2 \Delta S$, shifting predetermined logical values into said S texture coordinate value starting at an upper bit one greater than a most significant bit of said S texture coordinate value after truncation in said S address calculating step so as to obtain a modified value for said S texture coordinate value, and (d) adding said modified value for said S texture coordinate value to a coordinate origin value for said S and T coordinate values as an offset into said rectangular texture map so as to form said S address to said frame buffer;

calculating a T address to said frame buffer for said T texture coordinate value by repeating said steps (a) through (d) using said T texture coordinate value in place of said S texture coordinate value and using $log_2 \Delta T$ in place of $log_2 \Delta S$; and displaying a textured graphics primitive on said display device corresponding to a rectangular texture map stored in said frame buffer at said S and T addresses of said frame buffer.

2. A method as in claim 1, wherein textured data read from said frame buffer at said S and T addresses is combined with light source color data and written back to said frame buffer prior to display on said display device.

3. A method as in claim 2, wherein said light source color data is perspective interpolated for each pixel and combined with said textured data to obtain diffuse and specular components for said textured graphics primitive for display on said display device.

* * * * *